United States Patent
Coutinho et al.

(10) Patent No.: US 12,393,622 B2
(45) Date of Patent: Aug. 19, 2025

(54) SYSTEM AND METHOD FOR RECOMMENDING COMPUTATIONAL COMMANDS BASED ON A WEIGHTED, RANKED HIERARCHICAL GRAPH

(71) Applicant: ADP, Inc., Roseland, NJ (US)

(72) Inventors: Roberto Coutinho, Porto Alegre (BR);
Roberto Silveira, Porto Alegre (BR);
Guilherme Gomes, Porto Alegre (BR);
Carlos Nascimento, Porto Alegre (BR)

(73) Assignee: ADP, Inc., Roseland, NJ (US)

( * ) Notice: Subject to any disclaimer, the term of this patent is extended or adjusted under 35 U.S.C. 154(b) by 0 days.

(21) Appl. No.: 18/482,441

(22) Filed: Oct. 6, 2023

(65) Prior Publication Data
US 2024/0045894 A1 Feb. 8, 2024

Related U.S. Application Data

(63) Continuation of application No. 17/450,380, filed on Oct. 8, 2021, now Pat. No. 11,782,964.

(51) Int. Cl.
*G06F 16/334* (2025.01)
*G06F 16/338* (2019.01)
*G06F 16/34* (2019.01)
*G06F 40/279* (2020.01)

(52) U.S. Cl.
CPC ........ *G06F 16/3344* (2019.01); *G06F 16/338* (2019.01); *G06F 16/34* (2019.01); *G06F 40/279* (2020.01)

(58) Field of Classification Search
CPC .................................................. G06F 16/3344
See application file for complete search history.

(56) References Cited

U.S. PATENT DOCUMENTS

| | | | |
|---|---|---|---|
| 11,038,974 | B1 | 6/2021 | Koukoumidis et al. |
| 2016/0246840 | A1 | 8/2016 | Masiero et al. |
| 2018/0083892 | A1 | 3/2018 | Viswanathan et al. |
| 2018/0150749 | A1* | 5/2018 | Wu ........................ G06N 5/04 |
| 2018/0260445 | A1 | 9/2018 | Aravamudan et al. |
| 2019/0102078 | A1 | 4/2019 | Bhatt et al. |
| 2021/0081819 | A1* | 3/2021 | Polleri ................. G06F 16/252 |
| 2021/0232770 | A1 | 7/2021 | Lin et al. |

OTHER PUBLICATIONS

International Search Report and Written Opinion issued in corresponding International Application No. PCT/US2022/077759, dated Dec. 30, 2022 (12 pages).

(Continued)

*Primary Examiner* — Van H Oberly
(74) *Attorney, Agent, or Firm* — Foley & Lardner LLP

(57) ABSTRACT

Systems, methods, and computer-readable storage media for recommending computational commands based on a weighted, ranked hierarchical graph. The system converts a map of intended user actions to canonical actions (commands) into a graph representation. Then, via a chatbot algorithm, the system receives an initial intent as a request by a user of the chatbot algorithm. Based on the popularity of alternative canonical actions, the system makes recommendations of alternative actions which are similar to the initial intent provided by the user.

19 Claims, 4 Drawing Sheets

(56) References Cited

OTHER PUBLICATIONS

US Notice of Allowance issued in corresponding U.S. Appl. No. 17/450,380, dated May 25, 2023 (10 pages).
US Office Action issued in corresponding U.S. Appl. No. 17/450,380, dated Dec. 20, 2022 (13 pages).
Extended European Search Report issued in corresponding EP Patent Application No. 22879516.7, dated Jun. 26, 2025 (10 pages).

* cited by examiner

SYSTEM AND METHOD FOR RECOMMENDING COMPUTATIONAL COMMANDS BASED ON A WEIGHTED, RANKED HIERARCHICAL GRAPH

CROSS-REFERENCES TO RELATED APPLICATION

This application claims the benefit of priority under 35 U.S.C. § 120 as a continuation of U.S. patent application Ser. No. 17/450,380, filed Oct. 8, 2021, which is hereby incorporated herein by reference in its entirety.

TECHNICAL FIELD

The present disclosure relates to using natural language processing to recognize and recommend computational commands, and more specifically to making computational recommendations based on a hierarchical graph of related intents.

INTRODUCTION

Chatbots are computer applications/programs which allow users to communicate, using text, across a network with other users or with a computer system. For example, chatbots are commonly used in customer service, where the users can communicate with other users via the Internet or other network, using the chatbot as an Instant Messaging system. In other configurations, users may be chatting with a computer system configured to process the text of the user and then attempt to direct the user based on that text. In yet other configurations, a chatbot can be used by a user as a virtual assistant, allowing the user to initiate commands or executable algorithms at a computer system across a network. For example, the user could type in "add employee," and the computer system can execute an algorithm which allows the user to add an employee.

In configurations where users are attempting to initiate commands on a networked computer via a chatbot using natural language, if the user isn't precise in the natural language command, the system can either reject the user's command or interpret what command the user likely meant to input. This interpretation can be a computationally expensive task, requiring not only natural language processing on the user's input to the chatbot, but also a determination of what the user likely meant to enter.

SUMMARY OF THE INVENTION

Additional features and advantages of the disclosure will be set forth in the description that follows, and in part will be understood from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media which provide a technical solution to the technical problem described. A method for performing the concepts disclosed herein can include: receiving, at a host computer system from a database, a plurality of hierarchical intents, each intent in the plurality of hierarchical intents comprising at least one text-based word; mapping, via a processor of the host computer system, the plurality of hierarchical intents to a set of specific canonical actions, each canonical action in the set of specific canonical actions identifying an executable algorithm which the host computer system is configured to execute, resulting in a map of intents to canonical actions; reformatting, via the processor, the map of intents to canonical actions into a graph representation; executing, via the processor of the host computer system communicating across a network with a user computer system, a chatbot algorithm; receiving, at the processor via the chatbot algorithm, a ranked count of executed canonical actions, the ranked count of executed canonical actions identifying a number of times each canonical action within the graph representation has been executed by the processor; receiving, at the processor via the chatbot algorithm, an initial intent as a request by a user of the chatbot algorithm; and generating, via the processor, a recommended canonical action within the set of specific canonical actions, the recommended canonical action being based on a ranked count of executed canonical actions and the initial intent.

A system configured to perform the concepts disclosed herein can include: executing, by communicating across a network with a user computer system, a chatbot algorithm; receiving, via the chatbot algorithm, an initial intent as a request by a user of the chatbot algorithm; receiving, from a database, a plurality of hierarchical intents, each intent in the plurality of hierarchical intents comprising at least one text-based word; mapping the plurality of hierarchical intents to a set of specific canonical actions, each canonical action in the set of specific canonical actions identifying an executable algorithm which a host computer system is configured to execute, resulting in a map of intents to canonical actions; reformatting the map of intents to canonical actions into a graph representation; receiving, via the chatbot algorithm, a ranked count of executed canonical actions, the ranked count of executed canonical actions identifying a number of times each canonical action within the graph representation has been executed by the processor; and generating a recommended canonical action within the set of specific canonical actions, the recommended canonical action being based on the ranked count of executed canonical actions and the initial intent.

A non-transitory computer-readable storage medium configured as disclosed herein can have instructions stored which, when executed by a computing device, cause the computing device to perform operations which include: receiving, from a database, a plurality of hierarchical intents, each intent in the plurality of hierarchical intents comprising at least one text-based word; mapping the plurality of hierarchical intents to a set of specific canonical actions, each canonical action in the set of specific canonical actions identifying an executable algorithm which a host computer system is configured to execute, resulting in a map of intents to canonical actions; reformatting the map of intents to canonical actions into a graph representation; executing, by communicating across a network with a user computer system, a chatbot algorithm; receiving, via the chatbot algorithm, a ranked count of executed canonical actions, the ranked count of executed canonical actions identifying a number of times each canonical action within the graph representation has been executed by the processor; receiving, via the chatbot algorithm, an initial intent as a request by a user of the chatbot algorithm; and generating a recommended canonical action within the set of specific canonical actions, the recommended canonical action being based on the ranked count of executed canonical actions and the initial intent.

DETAILED DESCRIPTION

Figure 1:
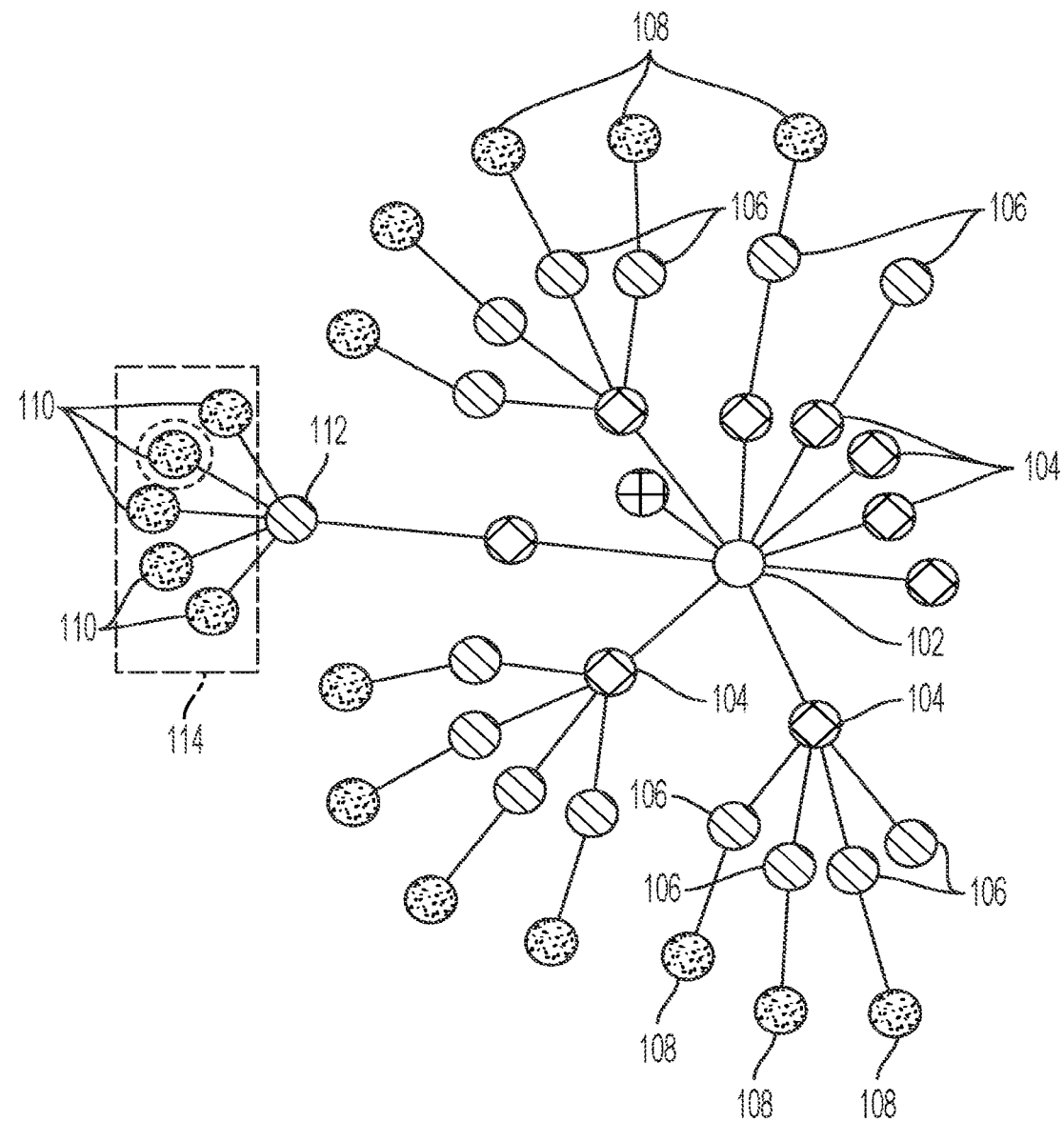
FIG. 1 illustrates an example graph.

Various embodiments of the disclosure are described in detail below. While specific implementations are described, it should be understood that this is done for illustration purposes only. Other components and configurations may be used without parting from the spirit and scope of the disclosure.

A system, method and computer-readable media configured as disclosed can reduce the number of computations needed for a computer system to identify a likely intent of a text-based instruction received across a network via a chatbot. More specifically, by converting a map of intents-to-known executable commands ("canonical actions") into a graph, the system can identify commands which are contextually or semantically close to the received intent using less computational power while simultaneously providing a higher quality of recommendations.

Consider the following example. A user wishes to initiate, via a chatbot operating on their desktop computer, application "ABC" on a server connected via a network (such as the Internet, a LAN (Local Area Network), WAN (Wide Area Network), etc.). However, as the user is typing into the chatbot, the user misspells ABC, inadvertently typing "ABD." A server, configured as disclosed herein, can retrieve from a database a list of known canonical actions which, if the user types one or more of the canonical actions into the chatbot, will cause the server to execute one or more programs/applications/algorithms associated with the user's typed command. The server can also retrieve from a database (which may or may not be the same database in which the list of canonical actions are stored) a list of hierarchical intents. These intents can be, for example: known misspellings of canonical actions; known words and/or phrases associated with canonical actions; domain names for related canonical actions (and associated misspellings, associated words, associated phrases, etc.); synonyms; and/or other context-related intents.

In another example, the user wishes to modify or change the role of an employee within a company, and types into the chatbot "change employee." However, there may be several possible intents associated with "change employee," such as removing the employee, changing their compensation, changing their name or profile, etc. The system can recommend such similar commands based on their grouping within a common domain of the hierarchy of intents.

The hierarchy of the intents can include, for example, intents grouped together by common domains, areas, or fields. For example, there could be a group "A" of multiple intents associated with a first canonical action ("fire employee"), and a group "B" of multiple intents associated with a second canonical action which is similar to, but distinct from, the first canonical action ("demote employee"). In some cases, the hierarchy can group or cluster both groups "A" and "B" into a common domain based on their similarity, allowing both groups A and B to remain distinct, but distantly related. The determination of how related the groups are can, for example, be based on grammatical/syntax/spelling similarity of the commands, based on the nature of the canonical actions (for example, if both commands are related to executing payroll processes), and/or based on similarity of executable code (for example, if codes execute a predefined threshold number of identical sub-routines, or have executable code which contains a predefined threshold amount of identical code).

The system can map the list of hierarchical intents to the list of known canonical actions. The hierarchical structure can be defined manually by business analysts, and can be stored in a database. The structure of the hierarchy can, for example, be made up of Operations Codes, Function Codes, Services Codes, and Domain Codes. For example, the hierarchical structure could be: /core/organizationManagement/ organizationDocumentManagement/documentManagement/document.create where: (1)/core/=a Domain Code,
(2) /organizationManagement/=a Service Code,
(3) /organizationDocumentManagement/=a Feature Code,
(4) /documentManagement/=a Function Code, and
(5) document.create=an Operation Code, and where the Operation Code is the intent.

In other circumstances the map of hierarchical intents to the list of canonical actions can be retrieved directly from one or more databases.

The system can then create a graph using the maps of the hierarchical intents to the canonical actions. For example, the generated graph can include nodes representing intents, nodes representing domain/higher level categorizations of the intents, nodes representing canonical actions, nodes associated with a particular system, and edges connecting the nodes. The edges can, for example, specify a level of authorization required to have access to the information associated with a specific connected node. In some configurations (such as the example graph illustrated in FIG. 1), the graph can be two dimensional, with relationships between the nodes capable of being displayed in an X/Y graph. The number of dimensions of a given graph depends, at least in part, on the data associated with the respective nodes. For example, if the nodes of the graph only have a name of an intent or a name of a canonical action, then a two dimensional graph can be generated by the computer system. If, however, the nodes have additional details, those additional details can be used to generate a multi-dimensional graph. For example, if the edges have weights or values embedded therein representing similarity scores, relationship status, etc., those additional weights or values can be used to create or modify how relationships within the graph are defined or established. Such additional dimensions can reinforce, or define, relationships between intents and/or canonical actions. One possible dimension that can be added to the canonical actions/intents nodes is a "Title"—for example, for the canonical action 'worker.hire,' the associated title could be "Hire an employee." The system can then convert this title into a latent representation, such as BERT (Bidirectional Encoder Representations from Transformers) embeddings within the graph, then use those embeddings when determining semantic similarity of nodes.

When a user is using a system as disclosed herein, they may enter, into a chatbot, a given intent. This input can be in the form of typed text, or can be text converted from speech via a speech-to-text algorithm executed by a computer system. The input text can then be transmitted across a network to a server or other computer system, where the input text can be converted into an original intent, then compared to the nodes of the generated graph.

To identify the original intent of the received text, the system can utilize machine learning, Artificial Intelligence, and Natural Language Processing (NLP) techniques. For example, the computer system can train a model using previously received text and the intents which were ultimately recognized from those intents. Feedback from users can result in iterative improvements to the model, which when executed by the computer system can identify the likely intent of the user who wrote/spoke the original input. For example, the system can include a user interface mechanism which gathers feedback from the user regarding the accuracy of recommendations, then uses that feedback as part of a reinforcement learning algorithm. The system can then modify, based on that reinforcement learning algorithm, the code of the recommendation algorithm to change which intents/canonical actions are recommended in a given circumstance. The system can also capture user interactions (e.g., to collect which option user has chosen in previous interactions) and then learn the distribution of user preferences in that given context (a technique that is sometimes referred as Multi-Armed Bandits). Such machine learning can, for example, be based on the individual user and/or based on aspects of the user's position or job (such as job title, division within a company, seniority, etc.).

In making the comparison, the server can identify which nodes of the graph are nearest to the input text. In some configurations, the server can be configured to create a temporary node associated with text which does not match any known intents or canonical actions of the graph. The system can then identify which non-temporary nodes are closest to the temporary node based on spelling/semantics. If, for example, the system detects that there are several nodes that are one "hop" (or edge) away from the temporary node, and several other nodes that are more than one hop away from the temporary node, the system can identify those nodes which are only one hop away as closer to the intent of the user and recommend those alternative intents associated with nodes which are only one hop away as recommended alternatives. Likewise, if the user enters an input which matches an intent for a canonical action the user is not authorized to execute, the system can identify the nodes closest (based on a number of hops) to the entered intent, and make recommendations of actions to the user which they are authorized to execute. In general, these recommendations may be from a common domain or subject area as the entered intent. However, in some cases (such as a graph containing multiple dimensions), the nearest intents may be from distinct subject areas/domains. The determination of "nearest" can, for example, be based on the least number of edges which need to be traversed in order to "walk" from one node to another, or can be based on mathematical determinations, such as the cosine distance between nodes, Euclidian Distances (L2-norm), and/or a squared distance. Cosine similarity is a measure of similarity between two non-zero vectors of an inner product space, and is used to determine how similar a vector is to other vectors. It is defined to equal the cosine of the angle between them, which is also the same as the inner product of the same vectors normalized to both have length 1.

Preferably, the system maintains a count of the number of times each canonical action is performed. When a user enters an intent, the system can compare the received intent to the list of popular or most executed intents. If the received intent is similar to (based on spelling, context, domain, etc.) a popular command, the system can recommend that popular command. In some cases, the system can weight the recommendations based on distances within the graph, popularity, and/or semantic similarity, etc., to generate recommendation scores for possible alternative commands/intents, then create a ranked list of recommendations based on those commands/intents. For example, the weight calculation can be defined as a MinMaxNorm(count(C)), where the weight is determined based on the normalized minimum and/or maximum number of times a given command or intent has been executed based on the counts for each canonical action ran within the system. In this manner, the system can identify a top-k intents, with the number of recommendations k depending on user preferences and/or system requirements.

Upon identifying the nearest intents, the system can present those recommended intents to the user as alternatives to the user's input. The user can then select one or more of those recommended intents, and the system can execute the canonical action associated with that selected intent. In this manner the system can identify commands (canonical actions) which are contextually or semantically close to the received intent using less computational power while simultaneously providing a higher quality of recommendations.

With that description, we turn to specific examples as illustrated in the figures.

FIG. 1 illustrates an example graph. In this graph is a central node 102, which can illustrate administrative rights or commands associated with the overall system. There are also nodes 104 directly linked to the central node 102, which may represent higher level authorization required in order to execute certain commands, or which may be associated with multiple categories (though not all categories) of lower level nodes 106, 108. The lowest nodes 106 can represent possible intents, and the nodes 108 immediately higher than those lowest nodes 106 can represent associated canonical actions (commands) which can be executed upon correctly entering a given intent. As further illustrated, there can be multiple intents 110 associated with a single canonical action 112, with the group of multiple intents 110 belonging to a common domain 114. In identifying alternative intents which a user may intend to enter, if a user were to enter an intent in the domain 114, the system can identify the other intents 110 within the domain 114 as likely alternatives. Similarly, the system may determine that a received intent is semantically similar to an intent from a distinct domain, and based on that semantic similarity recommend that alternative domain intent to the user.

Figure 2:
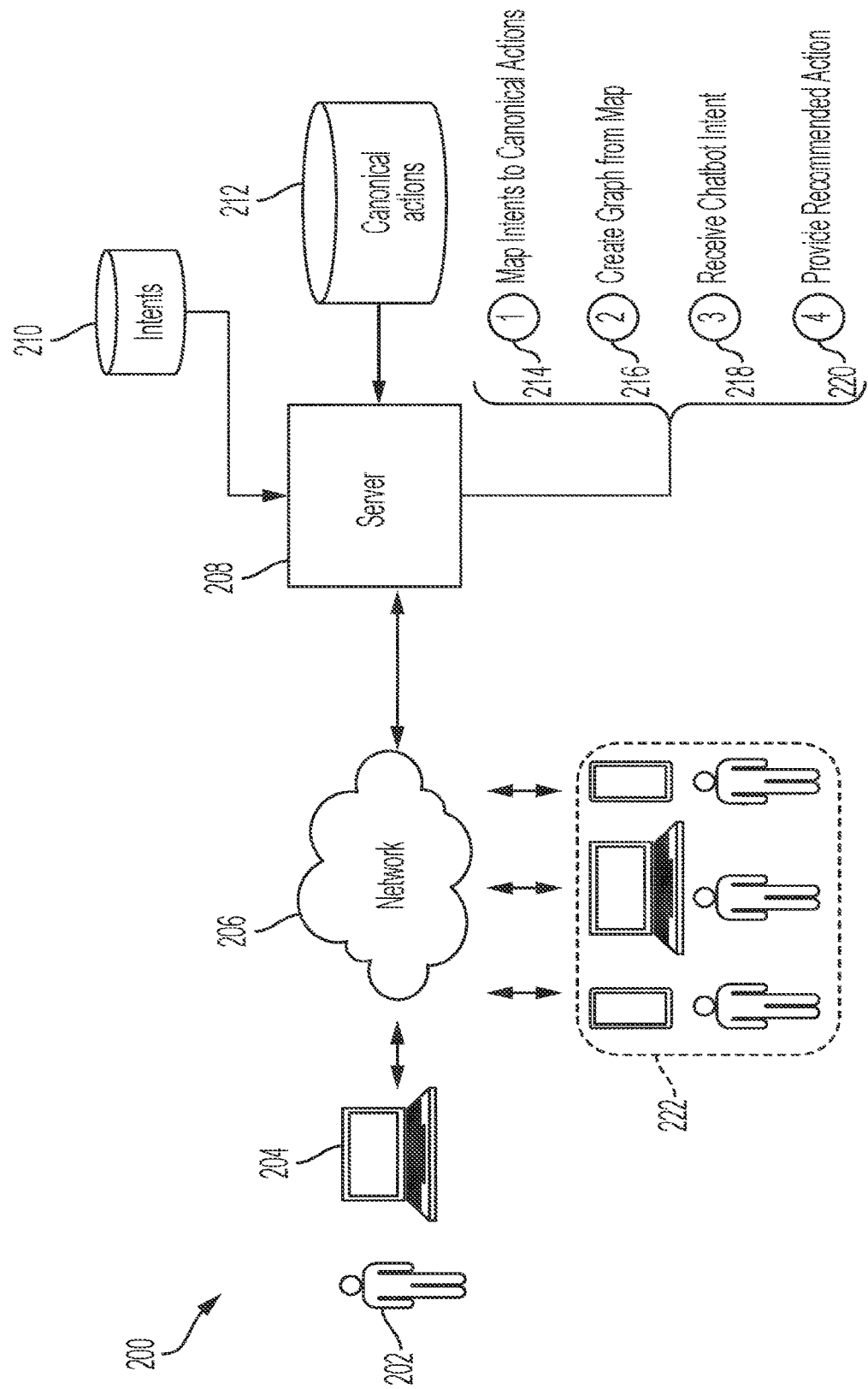
FIG. 2 illustrates an example system embodiment.

FIG. 2 illustrates an example system embodiment 200. In this example, a system includes a server 208 and databases 210, 212 interacting with users 222, 202 across a network 206. For example, as a user 202 uses a chatbot application on a computer 204 connected to a network (such as the Internet), the server 208 can download/receive a list of intents 210 from a database, as well as a list of possible canonical actions 212 (commands). The server can (1) map the list of intents to the possible canonical actions 214, (2) create a graph from that map 216, (3) receive the user's chatbot intent 218 in the form of text, and (4) provide recommended actions 220. These recommended actions can be known commands from the list of canonical actions based on distance from the received intent to other intents or actions within the graph; a list of ranked intents commonly executed by other users 222, the ranking being based on popularity; ranked intents based on semantic similarity, grammatical similarity, etc.; and/or other recommended actions. The server 208 then transmits these recommendations back across the network 206 to the user's 202 computer 204, where they can be displayed. The user can then choose to enter one or more of the recommended alternatives presented.

Figure 3:
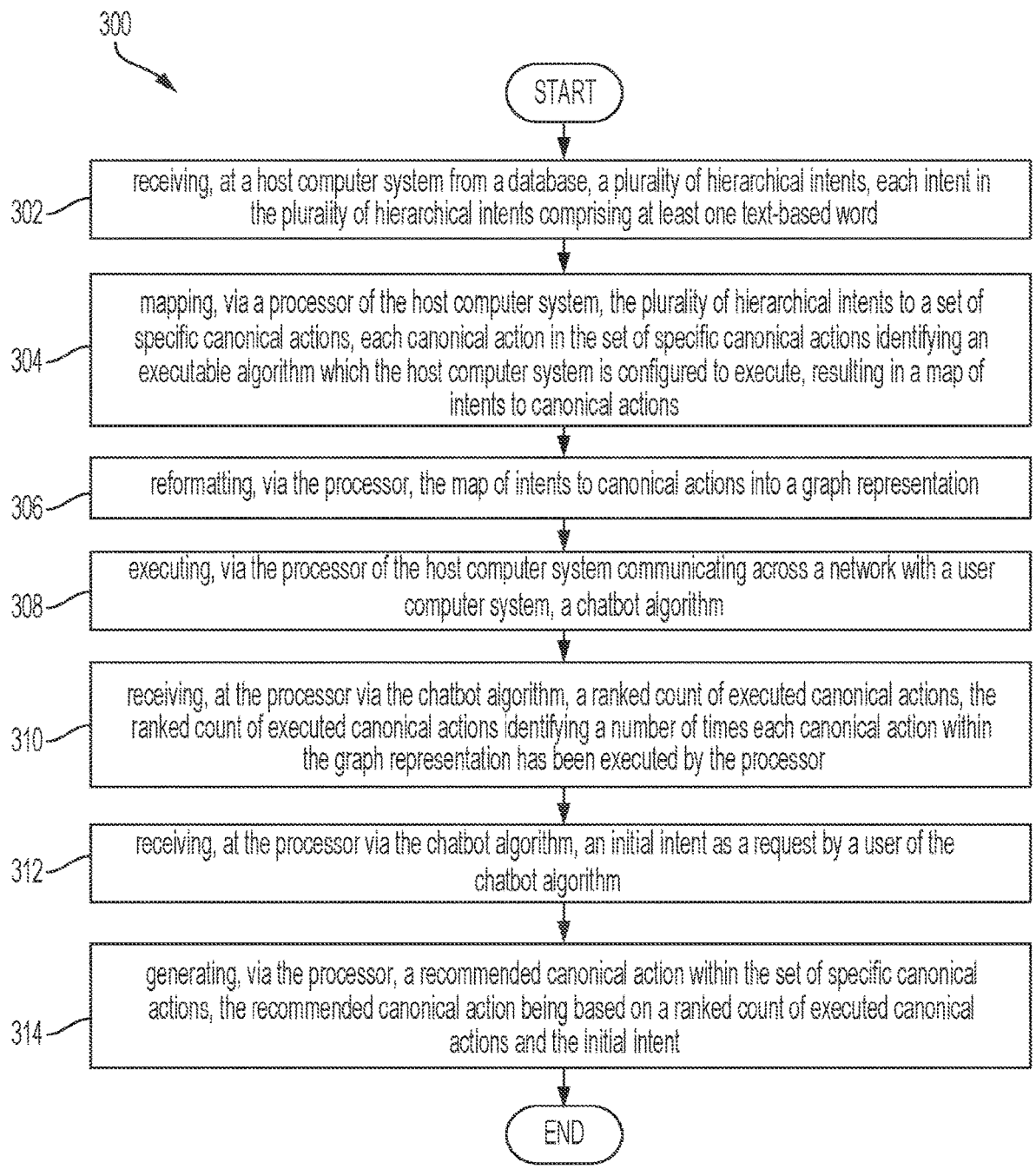
FIG. 3 illustrates an example method embodiment.

FIG. 3 illustrates an example method embodiment. As illustrated, the system receives, at a host computer system (such as a server) from a database, a plurality of hierarchical intents, each intent in the plurality of hierarchical intents comprising at least one text-based word (302). The system then maps, via a processor of the host computer system, the plurality of hierarchical intents to a set of specific canonical actions, each canonical action in the set of specific canonical actions identifying an executable algorithm which the host computer system is configured to execute, resulting in a map of intents to canonical actions (304). The system reformats, via the processor, the map of intents to canonical actions into a graph representation (306) and executes, via the processor of the host computer system communicating across a network with a user computer system, a chatbot algorithm (308). The system receives, at the processor via the chatbot algorithm, a ranked count of executed canonical actions, the ranked count of executed canonical actions identifying a number of times each canonical action within the graph representation has been executed by the processor (310). The system can then receive, at the processor via the chatbot algorithm, an initial intent as a request by a user of the chatbot algorithm (312) and generate, via the processor, a recommended canonical action within the set of specific canonical actions, the recommended canonical action being based on a ranked count of executed canonical actions and the initial intent (314).

In other configurations, the illustrated order can change. For example, illustrated steps (308) and (312) can occur at the beginning of the method, with the other illustrated steps following. In such a configuration, the overall flow sequence would be:

1. User types initial intent phrase (312).
2. The system generates recommendations based on the input intent (302-306, 310)
3. System provides top-k results as options to be chosen (310, 314)
4. User chooses the best recommendation, or the recommendation that matches their desired action Other changes in the illustrated order are also possible.

In some configurations, multiple intents within the plurality of hierarchical intents are mapped to a single canonical action within the set of specific canonical actions.

In some configurations, the ranked count of executed canonical actions is inclusive of canonical actions executed by all users (not solely the user who has provided the initial intent).

In some configurations, the illustrated method can further include: adding, to each canonical action in the set of specific canonical actions, a description of the canonical action, resulting in canonical action descriptions; executing, via the processor, natural language processing on the canonical action descriptions, resulting in digital descriptions of the canonical action descriptions; and calculating, via the processor, distances between each digital description within the digital descriptions of the canonical action descriptions, resulting in a plurality of distances between the canonical actions, wherein the recommended canonical action is further based on the plurality of distances. In such configurations, the plurality of distances are cosine distances.

In some configurations, the illustrated method can further include: walking, via the processor, the graph representation from a first canonical action associated with the initial intent to other canonical actions within a common domain, resulting in canonical actions within a specified distance in hops, wherein the recommended canonical action is further based on the canonical actions within the specified distance in hops. In such configurations, the common domain can include canonical actions linked by a single higher hierarchical node within the graph representation. Walking the graph representation can be interpreted as beginning with a single node, identifying nodes connected within the graph by a certain number of edges.

Figure 4:
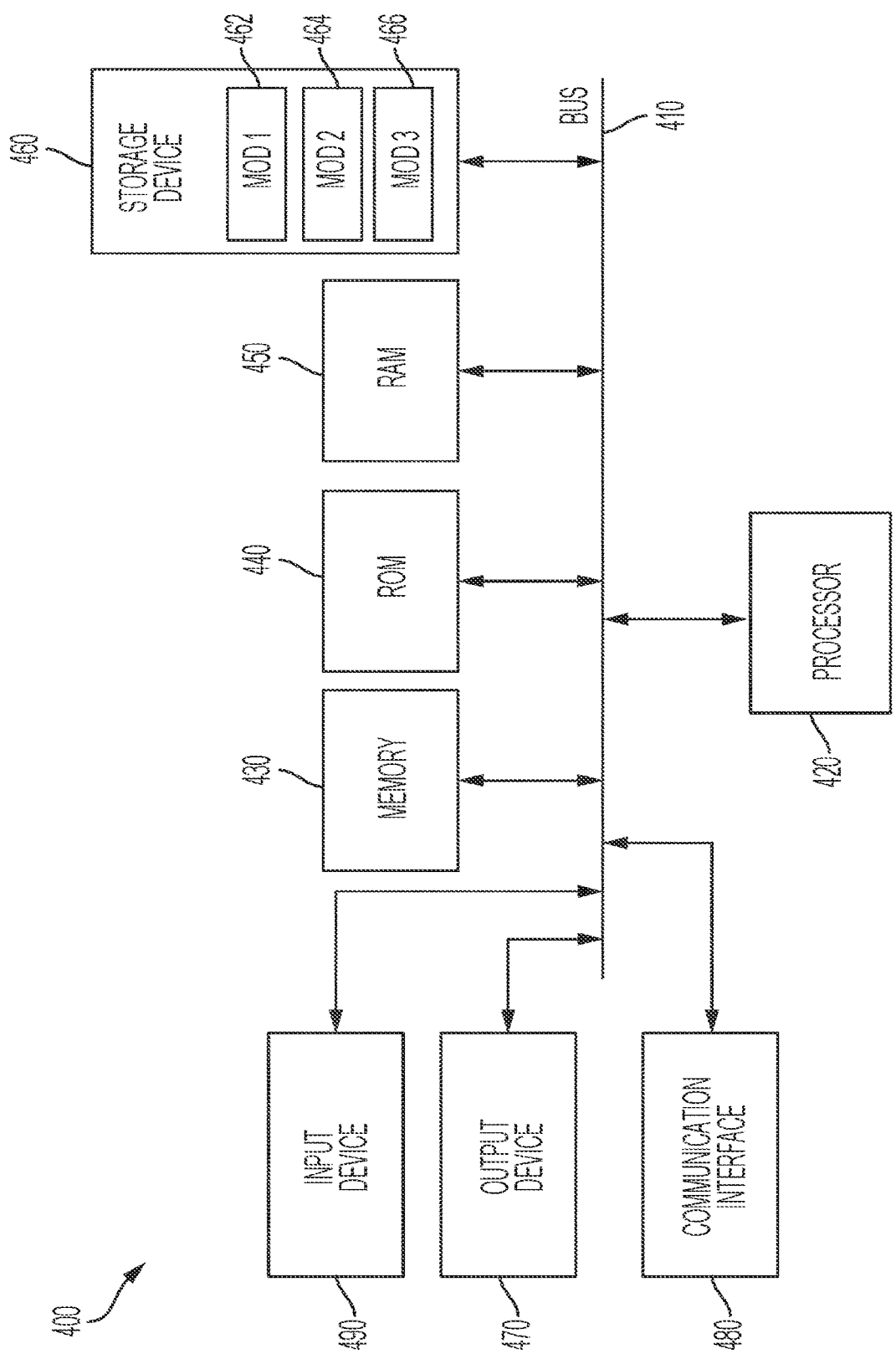
FIG. 4 illustrates an example computer system.

With reference to FIG. 4, an exemplary system includes a general-purpose computing device 400, including a processing unit (CPU or processor) 420 and a system bus 410 that couples various system components including the system memory 430 such as read-only memory (ROM) 440 and random access memory (RAM) 450 to the processor 420. The system 400 can include a cache of high-speed memory connected directly with, in close proximity to, or integrated as part of the processor 420. The system 400 copies data from the memory 430 and/or the storage device 460 to the cache for quick access by the processor 420. In this way, the cache provides a performance boost that avoids processor 420 delays while waiting for data. These and other modules can control or be configured to control the processor 420 to perform various actions. Other system memory 430 may be available for use as well. The memory 430 can include multiple different types of memory with different performance characteristics. It can be appreciated that the disclosure may operate on a computing device 400 with more than one processor 420 or on a group or cluster of computing devices networked together to provide greater processing capability. The processor 420 can include any general purpose processor and a hardware module or software module, such as module 1 462, module 2 464, and module 3 466 stored in storage device 460, configured to control the processor 420 as well as a special-purpose processor where software instructions are incorporated into the actual processor design. The processor 420 may essentially be a completely self-contained computing system, containing multiple cores or processors, a bus, memory controller, cache, etc. A multi-core processor may be symmetric or asymmetric.

The system bus 410 may be any of several types of bus structures including a memory bus or memory controller, a peripheral bus, and a local bus using any of a variety of bus architectures. A basic input/output (BIOS) stored in ROM 440 or the like, may provide the basic routine that helps to transfer information between elements within the computing device 400, such as during start-up. The computing device 400 further includes storage devices 460 such as a hard disk drive, a magnetic disk drive, an optical disk drive, tape drive or the like. The storage device 460 can include software modules 462, 464, 466 for controlling the processor 420. Other hardware or software modules are contemplated. The storage device 460 is connected to the system bus 410 by a drive interface. The drives and the associated computer-readable storage media provide nonvolatile storage of computer-readable instructions, data structures, program modules and other data for the computing device 400. In one aspect, a hardware module that performs a particular function includes the software component stored in a tangible computer-readable storage medium in connection with the necessary hardware components, such as the processor 420, bus 410, display 470, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 400 is a small, handheld computing device, a desktop computer, or a computer server.

Although the exemplary embodiment described herein employs the hard disk 460, other types of computer-readable media which can store data that are accessible by a computer, such as magnetic cassettes, flash memory cards, digital versatile disks, cartridges, random access memories (RAMs) 450, and read-only memory (ROM) 440, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 400, an input device 490 represents any number of input mechanisms, such as a microphone for speech, a touch-sensitive screen for gesture or graphical input, keyboard, mouse, motion input, speech and so forth. An output device 470 can also be one or more of a number of output mechanisms known to those of skill in the art. In some instances, multimodal systems enable a user to provide multiple types of input to communicate with the computing device 400. The communications interface 480 generally governs and manages the user input and system output. There is no restriction on operating on any particular hardware arrangement and therefore the basic features here may easily be substituted for improved hardware or firmware arrangements as they are developed.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of and similar phrases are not intended to convey a requirement that each possible item must be present, although each possible item may be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

What is claimed is:

1. A system, comprising: one or more processors coupled with memory, the one or more processors configured to:
   receive a request comprising an intent for a chatbot and an indication of an authorization level;
   identify a plurality of intents based on the intent, the plurality of intents connected to a common higher node in an electronic graph via a plurality of canonical actions that are configured to execute via the one or more processors;
   determine, based on edges in the electronic graph, authorization levels to access the plurality of intents;
   identify, based on the determined authorization levels, one or more intents from the plurality of intents that satisfy the authorization level;
   select a canonical action of the plurality of canonical actions that maps to the one or more intents of the plurality of intents that satisfy the authorization level; and
   provide, for execution, the canonical action.

2. The system of claim 1, wherein the one or more processors are further configured to:
   determine, in the electronic graph, that a first intent of the plurality of intents and a second intent of the plurality of intents are both mapped to the canonical action.

3. The system of claim 1, wherein the plurality of intents are located at a lower node relative to the plurality of canonical actions.

4. The system of claim 1, wherein the one or more processors are further configured to:
   receive a ranking of the plurality of canonical actions based on a count of executions of the plurality of canonical actions; and
   select the canonical action from the plurality of canonical actions based on the ranking.

5. The system of claim 1, wherein the one or more processors are further configured to:
   identify a plurality of descriptions respectively corresponding to the plurality of canonical actions;
   execute a natural language processing technique on the plurality of descriptions to generate a plurality of digital descriptions;
   determine a plurality of distances between the plurality of digital descriptions corresponding to the plurality of canonical actions; and
   select the canonical action from the plurality of canonical actions based on a shortest distance in the plurality of distances.

6. The system of claim 5, wherein the one or more processors are further configured to:
   determine the plurality of distances based on cosine distances.

7. The system of claim 1, wherein the chatbot comprises a virtual assistant.

8. The system of claim 1, wherein the chatbot is configured for text-based communication via an instant messaging system.

9. The system of claim 1, wherein the one or more processors are further configured to:
   display, via a graphical user interface, the canonical action;
   receive, via an input device, a selection of the canonical action; and
   execute the canonical action responsive to the selection.

10. A method, comprising:
   receiving, by one or more processors coupled with memory, a request comprising an intent for a chatbot and an indication of an authorization level;
   identifying, by the one or more processors, a plurality of intents based on the intent, the plurality of intents connected to a common higher node in an electronic graph via a plurality of canonical actions that are configured to execute via the one or more processors;
   determining, by the one or more processors, based on edges in the electronic graph, authorization levels to access the plurality of intents;
   identifying, by the one or more processors, based on the determined authorization levels, one or more intents from the plurality of intents that satisfy the authorization level;
   selecting, by the one or more processors, a canonical action of the plurality of canonical actions that maps to the one or more intents of the plurality of intents that satisfy the authorization level; and
   providing, by the one or more processors, the canonical action for execution.

11. The method of claim 10, comprising:
   determining, by the one or more processors, in the electronic graph, that a first intent of the plurality of intents and a second intent of the plurality of intents are both mapped to the canonical action in the electronic graph.

12. The method of claim 10, wherein the plurality of intents are located at a lower node relative to the plurality of canonical actions.

13. The method of claim 10, comprising:
   receiving, by the one or more processors, a ranking of the plurality of canonical actions based on a count of executions of the plurality of canonical actions; and
   selecting, by the one or more processors, the canonical action from the plurality of canonical actions based on the ranking.

14. The method of claim 10, comprising:
   identifying, by the one or more processors, a plurality of descriptions respectively corresponding to the plurality of canonical actions;
   executing, by the one or more processors, a natural language processing technique on the plurality of descriptions to generate a plurality of digital descriptions;
   determining, by the one or more processors, a plurality of distances between the plurality of digital descriptions corresponding to the plurality of canonical actions; and
   selecting, by the one or more processors, the canonical action from the plurality of canonical actions based on a shortest distance in the plurality of distances.

15. The method of claim 14, comprising:
   determining, by the one or more processors, the plurality of distances based on cosine distances.

16. The method of claim 10, wherein the chatbot comprises a virtual assistant.

17. The method of claim 10, wherein the chatbot is configured for text-based communication via an instant messaging system.

18. A non-transitory computer-readable medium storing processor executable instructions, the processor executable instructions configured to cause one or more processors to:
   receive a request comprising an intent for a chatbot and an indication of an authorization level;
   identify a plurality of intents based on the intent, the plurality of intents connected to a common higher node in an electronic graph via a plurality of canonical actions that are configured to execute via the one or more processors;
   determine, based on edges in the electronic graph, authorization levels to access the plurality of intents;
   identify, based on the determined authorization levels, one or more intents from the plurality of intents that satisfy the authorization level;
   select a canonical action of the plurality of canonical actions that maps to the one or more intents of the plurality of intents that satisfy the authorization level; and
   provide, for execution, the canonical action.

19. The non-transitory computer-readable medium of claim 18, wherein the processor executable instructions further include instructions to:
   determine, in the electronic graph, that a first intent of the plurality of intents and a second intent of the plurality of intents are both mapped to the canonical action.

* * * * *